United States Patent [19]

Fusco et al.

[11] Patent Number: 5,182,350

[45] Date of Patent: Jan. 26, 1993

[54] OZONE-RESISTANT BUTYL ELASTOMER

[75] Inventors: James V. Fusco, Red Bank; Hsien-Chang Wang, Edison; Kenneth W. Powers, Berkeley Heights, all of N.J.

[73] Assignee: Exxon Chemical Patents Inc, Linden, N.J.

[21] Appl. No.: 605,679

[22] Filed: Oct. 30, 1990

Related U.S. Application Data

[63] Continuation of Ser. No. 333,158, Apr. 4, 1989, abandoned.

[51] Int. Cl.⁵ .......................................... C08F 236/20
[52] U.S. Cl. .................................... 526/308; 526/185; 526/237; 526/335; 526/336
[58] Field of Search ............... 526/237, 336, 308, 335, 526/185

[56] References Cited

U.S. PATENT DOCUMENTS

| 2,356,128 | 8/1944 | Thomas | 260/79 |
| 2,356,129 | 8/1944 | Sparks et al. | 260/79 |
| 2,384,975 | 9/1945 | Sparks et al. | 526/336 X |
| 4,551,503 | 11/1985 | Lal et al. | 525/332.1 |

FOREIGN PATENT DOCUMENTS

| 0048627 | 3/1982 | European Pat. Off. | 526/90 |
| 0111391 | 6/1984 | European Pat. Off. | 528/502 |
| 0560924 | 4/1944 | United Kingdom | 526/336 |
| 1022279 | 3/1966 | United Kingdom | 526/336 |
| 1059580 | 2/1967 | United Kingdom | 526/336 |

OTHER PUBLICATIONS

Fusco and Hous, Rubber Technology, M. Morton, ed. Van Nostrand Reinhold, N.Y., 1987, 286–91.
Synthetic Rubber, by G. S. Whitby, 1954 edition by John Wiley and Sons, Inc. pp. 838,891.
"Isobutylene Polymers," Encyclopedia of Polymer Science and Engineering, vol. 8, 2nd edition, 1987, John Wiley & Sons, Inc., pp. 423–448.

Primary Examiner—Fred Teskin
Attorney, Agent, or Firm—H. L. Cohen; M. L. Gibbons; J. E. Schneider

[57] ABSTRACT

Ozone resistant vulcanizable copolymers of isoolefins with non-conjugated dienes of the general formula:

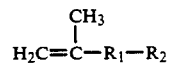

where $R_1$ is

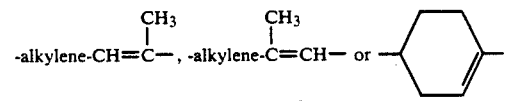

and $R_2$ is alkyl of 1 to 6 carbon atoms and vulcanizates thereof. The copolymers are prepared by polymerization in the presence of Lewis acids.

20 Claims, 1 Drawing Sheet

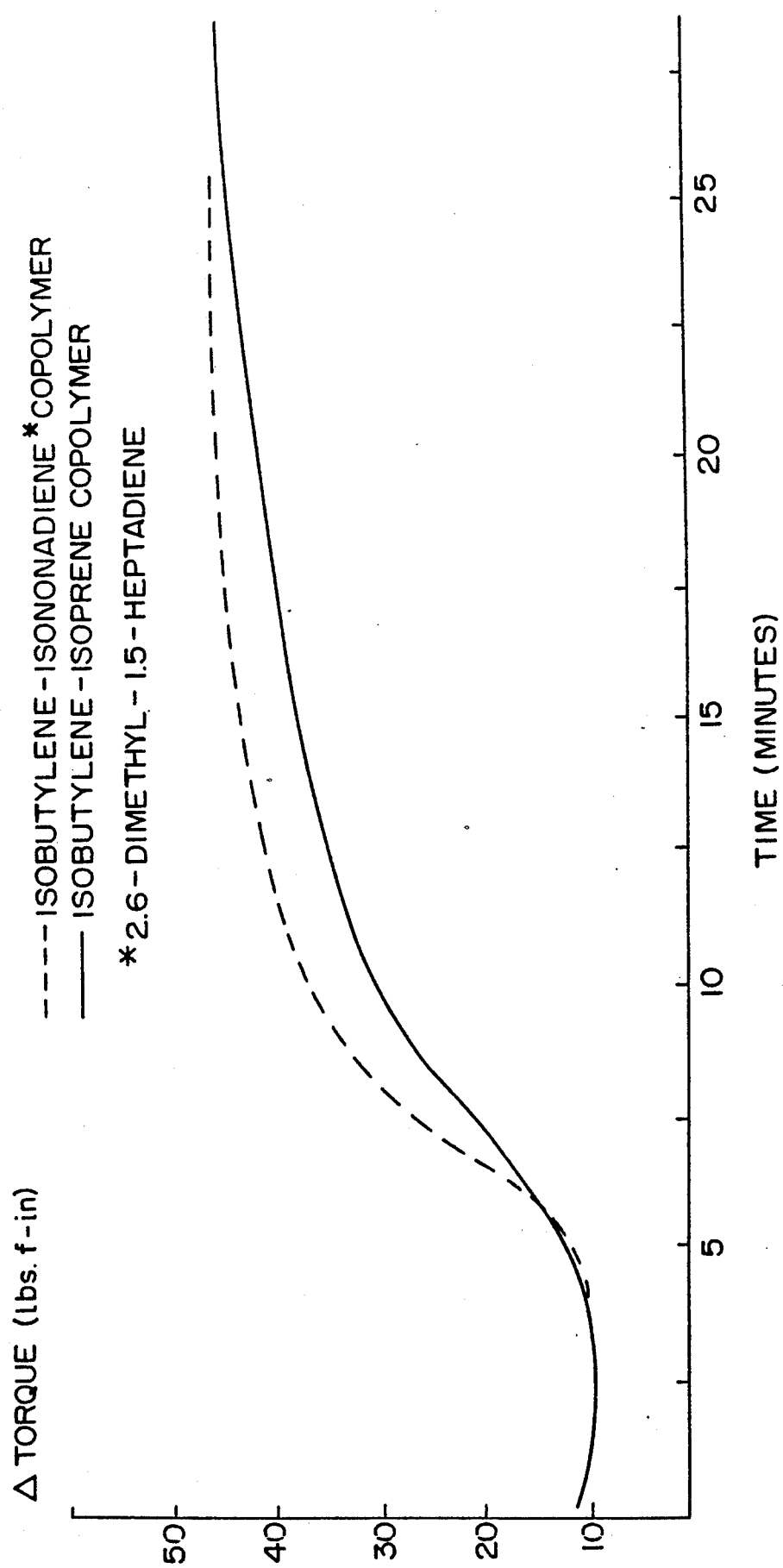

5,182,350

1

OZONE-RESISTANT BUTYL ELASTOMER

This is a continuation of application Ser. No. 333,158, filed Apr. 4, 1989, now abandoned.

BACKGROUND OF THE INVENTION

1. Field of the Invention

This invention relates to rubbery copolymers of isoolefins.

More specifically, the invention relates to ozone resistant copolymers of isoolefins with certain non-conjugated diolefins and methods for preparing them.

2. Prior Art

Copolymers comprising a major portion of an isoolefin and a minor portion of a conjugated multiolefins are referred to in the patents and literature as "butyl rubber"; see, for example, the textbook *Synthetic Rubber* by G. S. Whitby (1954 edition by John Wiley & Sons, Inc.), pages 838–891, and "Isobutylene Polymers", Encyclopedia of Polymer Science and Engineering (Vol. 8, 2nd Ed., 1987, John Wiley & Sons, Inc.) pages 423–448. The preferred isoolefin is isobutylene. Suitable conjugated multiolefins include isoprene, butadiene, dimethyl butadiene, piperylene, etc., especially, isoprene Commercial butyl rubber is a copolymer of isobutylene and minor amounts of isoprene. It is generally prepared in a slurry process using methyl chloride as a diluent and a Friedel-Crafts catalyst, typically $AlCl_3$, as the polymerization initiator. The methyl chloride offers the advantage that $AlCl_3$, a relatively inexpensive Friedel-Crafts catalyst, is soluble in it, as are the isobutylene and isoprene comonomers. Additionally, the butyl rubber polymer is insoluble in the methyl chloride and precipitates out of solution as fine particles to form a slurry. The polymerization is generally carried out at temperatures of about $-90°$ C. to $-100°$ C. See U.S. Pat. Nos. 2,356,128 and 2,356,129 incorporated herein by reference.

Conventional high molecular weight butyl rubber generally has a number average molecular weight of about 25,000 to about 500,000, preferably about 80,000 to about out 300,000, especially about 100,000 to about 250,000. Low molecular weight polymers have also been prepared with number average molecular weights of from 5,000 to 25,000. Polymers of even lower number average molecular weight, e.g. 500–5,000, can be produced if desired.

U.S. Pat. No. 2,384,975 to Sparks et al discloses copolymers of isoolefins with polyolefins broadly represented by the formula

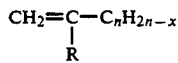

where R is an alkyl group, n is a whole number greater than 2 and x is an uneven number. This formula encompasses an enormous number of possible compounds. Many of these will not work in the copolymerization process; some because they will result in a gelled polymer; others because they are inert (when R is, for example, t-butyl or isopropyl, the resulting diolefine will not polymerize). Furthermore, although the patent refers to nonconjugated diolefins, the general formula is not so restricted (e.g. when n=5 and x=3). There is no recognition in the patent of the advantage in ozone resistance to be achieved by using the dienes of the present invention or the other benefits obtained thereby, including high copolymerization activity without gel formation and high vulcanization activity.

United Kingdom Pat. No. 1,059,580 to Polymer Corporation Limited discloses essentially soluble, vulcanizable copolymers of a $C_4$ to $C_7$ isolefin (55–99.7 mol %) with a non-conjugated diolefin of the general structure

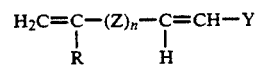

wherein R is an alkyl hydrocarbon radical having 1–3 carbon atoms or a phenyl radical, Z is a methylene or paraxylylene radical, n is from 1 to 4 when Z is methylene and n=1 when Z is paraxylylene, and Y is hydrogen or methyl. The polymerization is carried out by dispersing the monomers in a non-reactive diluent such as an alkyl halide, cooling the mixture to between $0°$ C. and $-164°$ C., and adding a Friedel-Crafts catalyst while stirring.

U.S. Pat. No. 4,551,503 to Lal et al. discloses copolymers of alpha-olefins and non-conjugated alpha, omega-dienes prepared by the use of organoaluminum compound-transition metal compound catalysts modified with hexa (hydrocarbyl) phosphoric triamides or organophosphate esters.

European patent application No. 48,627 to Marsh discloses a process for preparing low molecular weight liquid polymers of 1-olefins, including co-polymers with non-conjugated dienes including vinyl norbornene, d-limonene and 2-methyl-1,5-hexadiene, involving the use of a catalyst system comprising an organoaluminum compound, a methylallyl halide (which may also serve as a monomer), and a halide of tin or titanium.

European patent application No. 111,391 to Polysar Limited discloses tripolymers of isobutylene, isoprene, and 2,5-dimethyl 1,5-hexadiene, among others.

OBJECTS OF THE INVENTION

It is an object of this invention to provide high molecular weight copolymers of isoolefins having high vulcanization activity and vulcanizates thereof having superior ozone and evironmental resistance. It is an additional object of the invention to provide such copolymers are which are also gel free.

It is a further object of the invention to provide a method for preparing such copolymers. It is a still further object of the invention to prepare such copolymers using dienes having high copolymerization activity without gel formation.

SUMMARY OF THE INVENTION

The above and other objects are attained by providing a copolymer whose monomers are at least one isoolefin, preferably isobutylene, and at least one nonconjugated diene of the general formula

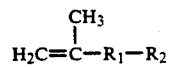

where $R_1$ is a member of the group consisting of

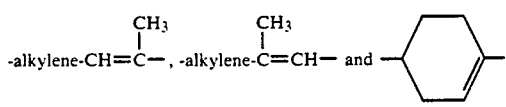

and $R_2$ is alkyl of 1 to 6 carbon atoms, preferably methyl. The alkylene group may be either straight or branched chain and is preferably a polymethylene group,—$(CH_2)_n$—, where n is 1 to 5. Dienes where n is 2 to 5 are most preferred The preferred compounds incorporating an alkylene group are 2,6-dimethyl-1,5-heptadiene and 2,4-dimethyl-1,4-hexadiene Where n is 1, lower molecular weight copolymers are obtained. The preferred compound where $R_1$ is

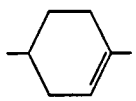

is limonene.

In the present invention the substituents $R_1$ and $R_2$ in combination comprises trisubstituted monoolefinic moieties, (i.e., wherein the doubly bonded carbon atoms are attached to only a single hydrogen atom)

The proportion of isoolefin in the polymer is in the range of about 85 to 99.5%, and preferably about 95.0 to 99.5%, by weight.

The copolymers are prepared by polymerization in the presence of Lewis acids, including Friedel-Crafts catalysts, preferably at a temperature in the range $-80°$ C. to $-100°$ C. and preferably in an inert diluent such as a halogenated hydrocarbon or alkane. The copolymers may be vulcanized by conventional methods.

BRIEF DESCRIPTION OF THE DRAWING

In the appended drawing, the sole figure is a graph plotting the results of torque tests on the isononadiene butyl of this invention and on conventional isobutylene-isoprene copolymer.

DETAILED DESCRIPTION OF THE INVENTION

In conventional butyl rubber, ozone vulnerability is a consequence of the unsaturation in the backbone of the polymer chain. Ozone attacks the double bond causing cracking and brittleness in the product. One method of preventing ozone vulnerability is to minimize the double bond concentration. The downside of this, however, is that vulcanization activity is lost.

In the present invention, the double bond is put in a side chain rather than the backbone main chain, so the main chain is not disrupted or degraded following ozone attack at the double bond. The advantage of this is that after ozone attack on the double bond on the side chain, the main chain remains intact. Thus, the invention provides the necessary high molecular weight rubber, which is gel free, vulcanizable, and, at the same time ozone resistant.

The polymers of the present invention are substantially random copolymers whose monomers are at least one isoolefin, e.g. isobutylene, with at least one non-conjugated diolefin having a terminal double bond with a methyl group in the 2 position to give the type III structure according to the Board Classification (Schmidt and Boord, J.A.C.S. 54. 751 (1932)), i.e.,

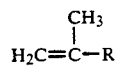

known to have carbocation polymerization activity with Friedel Crafts and other Lewis acid catalysts In the present invention, R comprises a trisubstituted monoolefinic moiety The non-conjugated diolefin moiety after copolymerization with the isoolefin, e.g., isobutylene, retains olefinic unsaturation pendant to the saturated polymer chain as depicted in the following illustrative reaction scheme, using isobutylene and 2,6-dimethyl 1,5-heptadiene:

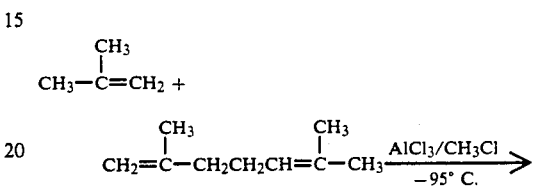

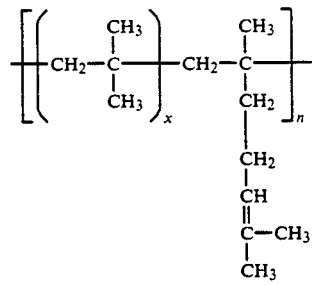

For a copolymer containing about 85 to 99.5 weight percent isobutylene, x is about 14 to 480. Since the copolymers of this invention are substantially random, at any given composition, x varies about its average value for such given composition. The value of n is proportional to the molecular weight of the copolymer produced. This class of non-conjugated diolefins may be synthesized via the metathesis disproportionation reaction, as illustrated below:

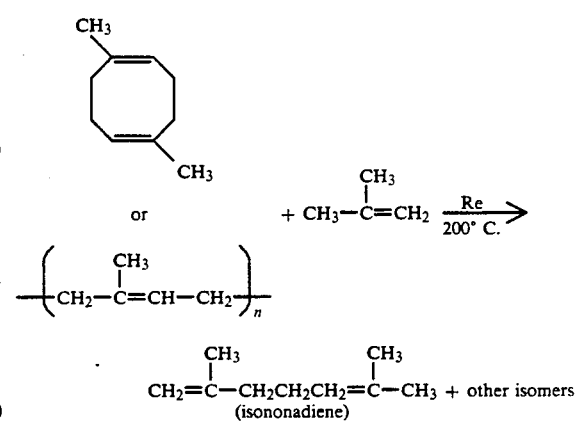

Instead of rhenium as shown above, other metathesis catalysts may be used. The non-conjugated diolefins can also be synthesized through other reactions, e.g. that disclosed in Japanese Patent Application (Kokai) No 59036626.

Copolymers of the present invention may be prepared by the slurry process generally employed for the preparation of conventional butyl rubber, as described in the discussion of prior art, above. Solution polymerization, wherein the monomers are in solution in hexane or other suitable solvent, may also be employed.

In the following examples, 2,6 dimethyl-1,5-heptadiene was copolymerized with isobutylene under a variety of conditions. The copolymers demonstrated good vulcanization activity in regular butyl-type vulcanization recipes and possessed outstanding ozone resistance and good physical properties comparable to regular butyl. The saturated nature of the new polymer backbone would be expected to also have excellent heat, environmental and flex resistance compared to regular butyl. Experimental details of the polymer synthesis are as follows:

EXAMPLES 1-5

Batch Dispersion Polymerization of 2,6-Dimethyl-1,5-Heptadiene/Isobutylene

A 500 ml reaction flask fitted with a thermometer, stirrer, and dropping funnel were set up in a glove box having an oxygen and moisture-free nitrogen atmosphere and the flask was cooled to −98° C. by immersion in a controlled temperature liquid nitrogen-cooled heat transfer bath The reactor was charged with 378 g purified dry methyl chloride, 48 5 g (0.87 mole) purified, dried and distilled polymerization grade isobutylene, and 3 3 g (26.6 m mole) dried (over molecular sieves) 2,6-dimethyl−1,5-heptadiene. The diluted catalyst solution consisting of 0.15 to 0.3% (wt) of catalyst in methyl chloride was allowed to drop slowly into the solution from the dropping funnel over the course of 10 to 15 minutes while stirring and attempting to maintain temperature by immersion of the reactor in the heat transfer bath A white dispersion of polymer was formed in the reactor. The reactor was then quenched by adding 25 ml of cold methanol to yield an agglomerated mass of white polymer in a clear colorless liquid. The polymer was recovered by allowing the methyl chloride to flash off and kneading and washing the polymer in methanol 0.2 weight percent of butylated hydroxytoluene (BHT) was added as an antioxidant and the polymer dried in a vacuum oven at 80° C. for 48 hours The polymerization conditions and polymer characterization data are summarized in Table I and the vulcanization and ozone resistance data for the polymers are summarized in Table II. The isoprene-butyl control polymer was Exxon Butyl 065.

TABLE II

COMPARATIVE OZONE RESISTANCE OF VULCANIZATES

| Property | Polymer Evaluated | |
|---|---|---|
| | Isoprene Butyl[1] | Isononadiene Butyl[1] |
| $M_v \times 10^{-3}$ | 350 | 130 |
| Unsaturation, mole % | 1.1 | 1.0 |
| Rheometer Data: | | |
| $T_{s2}$, minutes | 5.5 | 4.9 |
| $T_{90}$, minutes | 25.3 | 13.4 |
| Stress-Strain Properties | | |
| Shore A Hardness | 50 | 55 |
| Modulus 100% ($MP_A$) | 1.0 | 1.3 |
| Modulus 300% ($MP_A$) | 2.9 | 3.9 |
| Tensile ($MP_A$) | 15.1 | 10.6 |
| Elongation, % | 745 | 700 |
| Critical Elastic Stored Energy Density Ozone Test[2]: | | |
| $\epsilon_c$, % | <60 | >100 |
| $W_c$ kj/m³ | <117 | >1270 |

[1]Compound (parts by weight per hundred rubber hydrocarbon): Carbon black (GPF) - 40; Stearic acid - 1.0; ZnO - 5.0; Sulfur - 1.5; Tetramethylthiuram disulfide (TMTDS) - 1.0; Benzothiazyl disulfide (MBTS) - 1.0. Cured 30' at 150° C.
[2]Test conditions: 100 pphm ozone; 40° C.; tapered specimen ($\lambda_{AV}$ = 2.0); 72 hrs.

In another ozone test at 50 pphm, ozone using standard dumbbell samples extended, the isononadiene-butyl, after 180 days, showed no cracks. The corresponding isoprene butyl control polymer cracked in two days The critical Elastic Stored Energy Density Ozone Test, the results of which are tabulated above, was carried out by the method of Wilchinsky and Kresge, "Rubber Chem and Tech.", Vol. 47, pp. 895-905 (1974) All other terminology and tests are in accordance with the usage in Morton, "Rubber Technology", third edition (1987).

The drawing figure graphically sets forth the results of torque tests, using ASTM test D−2084-87, on conventional butyl rubber and on the isononadiene butyl rubber of this invention. The torque, plotted as a function of cure time, is proportional to the shear modulus (stiffness) of the specimens.

1-methyl−4-(1-methylethenyl) cycohexene, commonly known as limonene, is another non-conjugated diene falling within the general description of non-conjugated dienes useful in the present invention i.e., it is capable of copolymerization with isobutylene to yield high molecular weight, gel-free vulcanizable butyl rubbers with excellent ozone and environmental resistance Limonene has the structure:

TABLE I 2,6-DIMETHYL-1,5-HEPTADIENE ISOBUTYLENE COPOLYMER[a]

| Example | Catalyst Millimole | Polymerization Temp. °C. | Polymer Yield/q | $M_w$[b] ×10⁻³ | $M_n$[b] ×10⁻³ | $M_v$[c] ×10⁻³ | Mole %[d] Unsat. |
|---|---|---|---|---|---|---|---|
| 1 | EtAlCl₂/0.38 | −95 to −88 | 35.2 | 120 | 38 | 96 | 1.1 |
| 2 | EtAlCl₂/0.38 | −97 to −94 | 22.7 | 190 | 90 | 115 | 1.1 |
| 3 | BF₃/0.42 | −97 to −83 | 41.1 | 85 | 25 | 71 | 0.8 |
| 4 | BF₃/0.35 | −94 to −91 | 23.4 | 145 | 46 | 127 | 0.9 |
| 5 | AlCl₃/0.50 | −92 to −88 | 28.7 | 120 | 37 | 96 | 1.0 |

[a]Feed: 48.5 (0.87 mole) isobutylene. 3.3 (26.6 m mole) 2,6-dimethyl-1,5-heptadiene in 378 g CH₃Cl.
[b]GPC data.
[c]Viscosity average molecular weight determined in diisobutylene at 68° F.
[d]Determined by H'-NMR (δ ∼ 5.1 ppm)

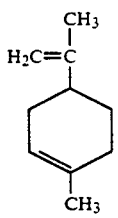

It contains an unsymmetrical disubstituted double bond in which one of the substituents is methyl (yielding minimum steric interference to propagation of the growing polymer chain) and the other substituent is a cycloalkenyl group having a methyl substituted double bond. Such a monomer provides many (i.e. seven) allylic hydrogens for good vulcanization activity and the vulcanization active double bond is not conjugated with the double bond active in copolymerization. Limonene differs from the other non-conjugated dienes disclosed as being effective herein in that the alkenyl group is a cyclolefin or unsaturated naphthene. As the data show, this cyclic alkenyl group appears to be advantageous in permitting higher molecular weight copolymers to be made than the other non-conjugated dienes disclosed herein. It is not clear whether the higher molecular weight arises because the cyclic alkenyl group affords lesser steric interference with propagation or because the ring double bond in limonene also becomes somewhat involved in the polymerization to produce a branched butyl of higher molecular weight. At any rate, the copolymer produced by copolymerizing isobutylene and limonene is gel free and generally of higher molecular weight than that achieved with the other non-conjugated dienes disclosed herein at similar polymer unsaturation levels. In fact, the molecular weight depression caused by copolymerizing limonene with isobutylene is about the same as that produced by isoprene, the commonly used conjugated diene used in producing commercial normal butyl rubber, with "in-chain" unsaturation which is vulnerable to ozone degradation and yields products with lesser environmental and heat resistance.

It is believed that the copolymer produced by copolymerizing limonene and isobutylene has predominately the following structure:

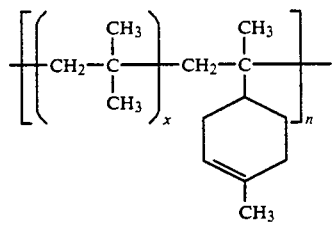

As with the isononadiene butyl, for a copolymer. containing about 85 to 99.5% weight percent isobutylene, x is about 14 to 480 and the value of n is proportional to the molecular weight of the copolymer produced. Since the copolymers of this invention are substantially random, at any
composition, x varies about its average value for such given composition.

The resulting unsaturation is pendant, methyl substituted, and in a ring to yield excellent ozone, environmental, and heat resistant butyl vulcanizates. This coupled with the availability and cost of limonene (one of the common terpenes) makes it a desirable comonomer for producing the novel ozone-resistant butyl elastomers of this invention.

EXAMPLES 6-13

Data from a series of batch dry box polymerizations to prepare limonene/isobutylene copolymers are summarized in Table III. The limonene used was d- limonene (97% purity, Aldrich Chemical Co.). It was dried over alumina and used without further purification The isobutylene, methyl chloride, and catalyst were standard butyl polymerization grade materials and were dried and purified as in Examples 1-5. Polymerizations were run in the three neck 500 ml reaction flasks fitted with a thermometer dropping funnel and stirrer as already described. The reactors were cooled to $-98°$ C. by immersion in a temperature controlled liquid nitrogen cooled bath in a nitrogen purged dry box. The reactors were charged with 460 g of a feed comprising 10.5 weight percent isobutylene in methyl chloride with the indicated amount of limonene or other diene. Polymerizations were initiated by dripping in a chilled catalyst solution consisting of 0.3 percent ethyl aluminum dichloride (EADC) in methyl chloride over the course of 10 to 15 minutes at a rate slow enough for heat transfer between the reactor and bath to occur and prevent substantial temperature rise in the reactor. When sufficient copolymer had been produced, the reaction was quenched with methanol and the polymer recovered by warming and allowing the monomers and diluent to flash off in a hood and then kneading the polymer in isopropanol to remove catalyst residues The polymer was stabilized by mixing in 0.2 wt. percent BHT and then vacuum oven dried at $80°$ C. for 48 hours

TABLE III.

| | COMPARISON OF LIMONENE AND ISOPRENE AS COMONOMERS WITH ISOBUTYLENE | | | | | | |
|---|---|---|---|---|---|---|---|
| Example | Diene Wt. % on iC4 | Millimole Catalyst | Conv. % | Polymer Yield q | Polymerization Temp. °C. | $M_v \times 10^{-3}$ | Mole % Unsat. |
| 6 | Isoprene/3.1 | 0.30 | 24 | 12.0 | $-99$ to $-97$ | 898 | 1.3 |
| 7 | Limonene/6.2 | 0.35 | 44 | 22.0 | $-96$ to $-94$ | 763 | 0.7 |
| 8 | Limonene/6.2 | 0.40 | 30 | 15.0 | $-98$ to $-96$ | 747 | 0.7 |
| 9 | Isoprene/3.1 | 0.24 | 30 | 15.0 | $-98$ to $-95$ | 477 | 1.4 |
| 10 | Limonene/3.1 | 0.21 | 22 | 11.0 | $-98$ to $-95$ | 824 | 0.6 |

TABLE III-continued
COMPARISON OF LIMONENE AND ISOPRENE AS COMONOMERS WITH ISOBUTYLENE

| Example | Diene Wt. % on iC4 | Millimole Catalyst | Conv. % | Polymer Yield q | Polymerization Temp. °C | $M_v \times 10^{-3}$ | Mole % Unsat. |
|---|---|---|---|---|---|---|---|
| 11 | Limonene/9.3 | 0.20 | 50 | 26.4 | −96 to −93 | 460 | 0.9 |
| 12 | Isoprene/3.1 | 0.35 | 22 | 11.0 | −95 to −93 | 430 | 1.3 |
| 13 | Limonene/9.3 | 0.30 | 28 | 15.1 | −96 to −93 | 950 | 0.8 |

The data show that copolymers based on limonene can be produced at molecular weights comparable to those using isoprene as the diene and such higher than those using isononadiene or the other non-conjugated dienes described herein. Of course, because of its higher molecular weight, more limonene is required than isoprene in order to achieve a particular mole percent unsaturation in the copolymer. The data also indicate that limonene becomes increasingly less efficient at raising copolymer unsaturation as more is used (i.e., raising limonene level from 3.1 to 6.2 to 9.3 only raises mole percent unsaturation from 0.6 to 0.7 to 0.85).

Limonene copolymers prepared from feeds containing 6.2 weight percent limonene on isobutylene and containing 0.7 mole percent unsaturation with molecular weights above 700K (such as Examples 7 & 8) were combined and mill-mixed with carbon black, stearic acid and zinc oxide and then curatives were added as shown in Table IV. The cure resulted in good vulcanizates with complete ozone resistance. Data showing a comparison of the limonene butyl with isoprene butyl (Exxon Butyl 065) are shown in Table IV. The limonene butyl is slower curing but yields vulcanizates which are completely unaffected by ozone as compared to regular isoprene butyls.

TABLE IV
COMPARATIVE OZONE RESISTANCE OF VULCANIZATES

| | Polymer Evaluated | |
|---|---|---|
| | Limonene Butyl (0.7 Mole % Unsat.) | Isoprene- Butyl (Exxon Butyl 065) (1.0 Mole % Unsat.) |
| | Parts by Weight | |
| Compound: | | |
| Polymer | 100 | 100 |
| IRB #6 Black | 50 | 50 |
| Zinc Oxide | 5 | 5 |
| Stearic Acid | 1 | 1 |
| Accelerators: | | |
| Sulfur | 1.25 | 1.25 |
| TMTDS | 1.50 | 1.50 |
| MBTS | 1.50 | 1.50 |
| Vulcanizate Properties (Cured 40 Min. @ 160° C.): | | |
| Stress-Strain Properties: | | |
| Shore A Hardness | 55 | 62 |
| 300% Modulus, MPa | 3.7 | 5.9 |
| Tensile, MPa | 13.5 | 16.6 |
| Elongation, % | 800 | 635 |
| Ozone Resistance[1]: | | |
| Time to crack | no cracks after 6 months | cracked 1 day, broken 3 days |

[1] 100 pphm, 40° C., tapered specimen ($a_{ave} = 2.0$)

2,4-Dimethyl−1,4 hexadiene (isooctadiene) is another non-conjugated diene falling within the general description of non-conjugated dienes capable of copolymerization with isobutylene to yield high molecular weight substantially gel-free vulcanizable isobutylene copolymer rubbers with excellent ozone and environmental resistance. Isooctadiene has the structure:

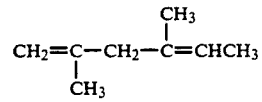

and is closely related to isononadiene. Both contain the necessary unsymmetrical disubstituted double bond with one methyl substituent and an alkenyl group containing a methyl substituted double bond not conjugated with the polymerization active double bond. They would be expected to behave similarly in copolymerization with isobutylene and to yield similar, ozone resistant, vulcanizable butyl rubbers with pendant unsaturation. They would also be expected to have similar vulcanization activity since the pendant unsaturation contains eight allylic hydrogens with both monomers.

Isooctadiene contains one less carbon atom between the double bonds than isononadiene and so represents the minimum separation possible between non-conjugated double bonds. It can be produced readily by codimerization between isoprene and propylene but is not available in as high purity as isononadiene which is produced by metathesis involving dimethyl cyclooctadiene and isobutylene, as described above. Isooctadiene is believed to incorporate similarly to isononadiene to yield a butyl rubber with the following predominant structure:

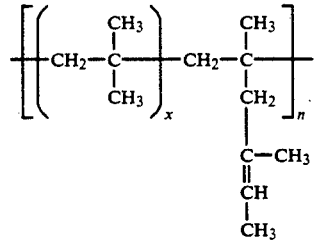

where x and n are as above defined.

The resultant pendant unsaturation with eight allylic hydrogens yields a good vulcanizable ozone resistant butyl rubber.

EXAMPLES 14-16

Data from a dry box run to prepare an isooctadiene/isobutylene copolymer are summarized in Table V. The isooctadiene used was prepared by codimerization and was 85 percent 2,4-dimethyl−1,4-hexadiene with the balance being other isomers. It was dried over alumina and vacuum distilled before use. The other materials were standard as previously described and the batch polymerization were run with EtAlCl₂ as

TABLE V
ISOOCTADIENE AS A COMONOMER WITH ISOBUTYLENE

| Example | Diene Wt. % on iC4 | Millimole Catalyst | Conv. % | Polymer Yield q | Polymerization Temp. °C. | $M_v \times 10^{-3}$ | Mole % Unsat. |
|---|---|---|---|---|---|---|---|
| 14 | Isoprene/3.1 | 0.30 | 24 | 12.0 | −99 to −97 | 898 | 1.3 |
| 15 | Isooctadiene/5.0 | 0.40 | 21 | 10.5 | −95 to −93 | 145 | 1.1 |
| 7[(1)] | Limonene/6.2 | 0.35 | 44 | 22.5 | −96 to −94 | 763 | 0.7 |

[(1)] From Table III

The data show that isooctadiene copolymerizes with isobutylene to yield a copolymer with pendant unsaturation but that molecular weight depression is more severe than that caused by isoprene or limonene as the diene. Isooctadiene causes molecular weight depression similar to but greater than isononadiene, perhaps because of its lower purity or because of the presence of hydrogens which are allylic to both double bonds and have greater chain transfer activity Nevertheless, it is a suitable comonomer for producing isobutylene copolymer rubbers with excellent ozone, heat, and environmental resistance and further substantiates that non-conjugated dienes of the described structures are advantageous for producing the improved ozone-resistant butyl rubbers of this invention.

While certain representative embodiments and details have been shown for the purpose of illustrating the invention, it will be apparent to those skilled in this art that various changes may be made therein without departing from the spirit or scope of the invention.

We claim:

1. A vulcanizable copolymer of at least one isoolefin and at least one non-conjugated diene of the formula

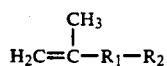

where $R_1$ is a member of the group consisting of

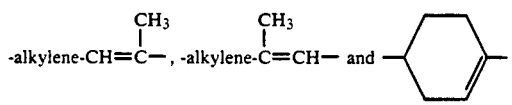

and $R_2$ is a $C_1$ to $C_6$ alkyl group, said copolymer containing about 85 to 99.5 weight percent of said at least one isoolefin moiety.

2. A copolymer of claim 1 wherein $R_2$ is methyl.

3. A copolymer of claim 1 wherein said non-conjugated diene has the formula

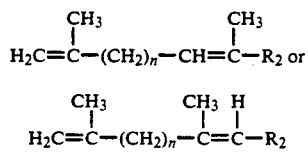

where n is 1 to 5 and $R_2$ is an alkyl group of 1 to 6 carbon atoms.

4. A copolymer of claim 3 wherein said isoolefin is isobutylene.

5. A copolymer of claim 4 wherein $R_2$ is methyl.

6. A copolymer of claim 1 wherein said isoolefin is isobutylene and said non-conjugated diene is 2,6-dimethyl−1,5-heptadiene.

7. A copolymer of claim 1 wherein said isoolefin is isobutylene and said non-conjugated diene is limonene.

8. A copolymer of claim 1 wherein said isoolefin is isobutylene and said non-conjugated diene is 2,4-dimethyl−1,4-hexadiene.

9. A rubbery vulcanizate of a copolymer according to any of claims 1 to 8.

10. The process of preparing a copolymer of at least one isoolefin with at least one non-conjugated diene of the formula

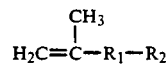

where $R_1$ is a member of the group consisting of

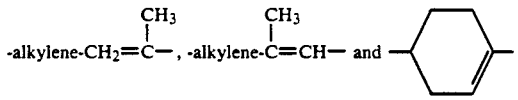

and $R_2$ is a $C_1$ to $C_6$ alkyl group, comprising reacting said isoolefin with said non-conjugated diene in the presence of a Lewis acid catalyst, said isoolefin constituting about 85 to 99.5 percent by weight of the monomers.

11. The process of claim 10 wherein said catalyst is a Friedel-Crafts catalyst

12. The process of claim 10 wherein said catalyst is selected from the group consisting of $AlCl_3$, $EtAlCl_2$ and $BF_3$.

13. The process of claim 10 wherein the reaction is carried out at a temperature between −80° C. and −100° C. in an inert diluent.

14. The process of claim 13 wherein said inert diluent is a halogenated hydrocarbon or alkane.

15. The process of claim 10 wherein said non-conjugated diene has the formula

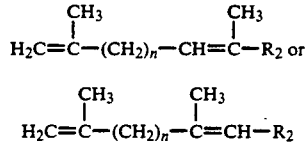

where n is 1 to 5 and $R_2$ is alkyl of 1 to 6 carbon atoms.

16. The process of claim 15 wherein said isoolefin is isobutylene.

17. The process of claim 16 wherein $R_2$ is methyl.

18. The process of claim 10 wherein said non-conjugated diene is 2,6-dimethyl−1,5-heptadiene.

19. The process of claim 10 wherein said non-conjugated diene is limonene.

20. The process of claim 10 wherein said non-conjugated diene is 2,4-dimethyl−1,4-hexadiene.

* * * * *